United States Patent [19]

Noguchi

[11] Patent Number: 5,017,254

[45] Date of Patent: May 21, 1991

[54] METHOD OF MAKING INFLATABLE BODIES

[75] Inventor: Tatsuo Noguchi, Osaka, Japan

[73] Assignee: Nihonmatal Co., Ltd., Tokyo, Japan

[21] Appl. No.: 268,477

[22] Filed: Nov. 7, 1988

[30] Foreign Application Priority Data

Mar. 19, 1988 [JP] Japan .................................. 63-66368
May 2, 1988 [JP] Japan ................................. 63-109784

[51] Int. Cl.$^5$ ............................................. B32B 31/00
[52] U.S. Cl. .................................. 156/227; 156/267; 446/220
[58] Field of Search ............... 446/220, 221, 222, 223, 446/224, 225, 226; 156/204, 199, 217, 227, 267, 251

[56] References Cited

U.S. PATENT DOCUMENTS

| | | | |
|---|---|---|---|
| 1,625,394 | 4/1927 | Roberts | 446/220 X |
| 1,697,459 | 1/1929 | Dorogi et al. | 446/226 |
| 1,801,267 | 4/1931 | Dorogi et al. | 446/226 |
| 1,816,472 | 7/1931 | Dorogi et al. | 446/226 |
| 1,885,917 | 11/1932 | Kelemen et al. | 446/226 |
| 2,470,940 | 5/1949 | Kennedy | 446/220 X |
| 2,515,804 | 7/1950 | Shufer | 446/226 X |
| 2,665,519 | 1/1954 | Burkes | 446/220 X |
| 3,230,663 | 1/1966 | Shabram | 446/224 |
| 3,368,692 | 2/1968 | Voller | 156/204 X |
| 3,664,058 | 5/1972 | Brieske | 446/226 X |
| 4,877,473 | 10/1989 | Snowdon et al. | 156/204 |

FOREIGN PATENT DOCUMENTS 62-111734 5/1987 Japan .................................. 446/220
281933 12/1927 United Kingdom ................ 446/226

Primary Examiner—Mickey Yu
Attorney, Agent, or Firm—Lane, Aitken & McCann

[57] ABSTRACT

A method for producing a floating body such as a balloon and the like which has a first swelling portion with a gas inlet port and a plurality of second swelling portions each communicating with the first swelling portion, comprising the steps of:

folding a single multi-layer film having a sealing capability and pleat portions so that the nonpleat portion, correspond to the first swelling portion of the floating body is formed in the film and pleat portions corresponding to the plurality of second swelling portions;

sealing the folded multi-layer film along a seal line which extends over both the pleat and nonpleat portions and forms the gas inlet port in the nonpleat portion to produce the first swelling portion and the plurality of second swelling portions; and cutting and removing material located externally of the sealed multi-layer film along a line substantially parallel to the seal line.

6 Claims, 4 Drawing Sheets

METHOD OF MAKING INFLATABLE BODIES

FIELD OF THE INVENTION

The present invention relates to floating bodies such as balloons and the like, and a method for producing such floating bodies.

DESCRIPTION OF THE PRIOR ART

It has been known that a sheet of plastic film folded in two is heat sealed and the heat sealed plastic film is inflated with gas to a simple globular shape to obtain a floating body such a balloon and the like. However, in the conventional heat sealing method of the above kind, only a floating body of simple globular shape can be obtained, and in order to obtain a floating body of complex shape, multiple sheets of plastic film must be heat sealed several times.

It is accordingly an object of the present invention to provide a floating body of complex shape obtained by single heat sealing and a method for producing such a floating body.

SUMMARY OF THE INVENTION

In accordance with one important aspect of the present invention, there is provided a floating body such as a balloon and the like, comprising a single multi-layer film being heat sealed so as to have a first single swelling portion having a gas inlet port through which gas is introduced to inflate the floating body and have a plurality of second swelling portions each being held in fluid communication with the first single swelling portion. The plurality of second swelling portions may comprise swelling portions of exactly equal size. The plurality of second swelling portions also may comprise different swelling portions of different length. The floating body may float in air due to buoyancy of the gas, when the gas is introduced through the gas inlet port in the floating body. The floating body may be stationarily placed on a floor, ground and the like, when the gas is introduced through the gas inlet port in the floating body. The single multi-layer film may comprise a nylon film having an aluminum film deposited on one surface thereof and an anchor coat film coated on the other surface thereof, and a polyethylene resin film laminated on the anchor coat film.

In accordance with another important aspect of the present invention, there is provided a floating body such as a balloon and the like, comprising a plurality multi-layer films being heat sealed so as to have a first single swelling portion having a gas inlet port through which gas is introduced to inflate the floating body and have a plurality of second swelling portions each being held in fluid communication with the first single swelling portion. The plurality of second swelling portions may comprise swelling portions of exactly equal size. The plurality of second swelling portions also may comprise different swelling portions of different length. The floating body may float in air due to buoyancy of the gas, when the gas is introduced through the gas inlet port in the floating body. The floating body may be stationarily placed on a floor, ground and the like, when the gas is introduced through the gas inlet port in the floating body. Each of the plurality of multi-layer films may comprise a nylon film having an aluminum film deposited on one surface thereof and an anchor coat film coated on the other surface thereof, and a polyethylene resin film laminated on the anchor coat film.

In accordance with another important aspect of the present invention, there is provided a method for producing a floating body such as a balloon and the like which has a first swelling portion with a gas inlet port and a plurality of second swelling portions each communicating with the first swelling portion, comprising the steps of: folding a single multi-layer film having a sealing capability to form a nonpleat portion and pleat portions so that the nonpleat portion corresponds to the first swelling portion of the floating body film and the pleat portions corresponds to the plurality of second swelling portions sealing the folded multi-layer film along a seal line which extends over both the pleat and nonpleat portions and forms the gas inlet port in the nonpleat portion to produce the first swelling portion and the plurality of second swelling portions; and cutting and removing material located externally of the sealed multi-layer film along a line substantially parallel to the seal line. The plurality of second swelling portions of the floating body may comprise swelling portions of exactly equal size. The plurality of second swelling portions of the floating body also may comprise different swelling portions of different length.

BRIEF DESCRIPTION OF THE DRAWINGS

The feature and advantages of a floating body and a method for producing the floating body in accordance with the present invention will be more clearly understood from the following description taken in conjunction with the accompanying drawings.

DESCRIPTION OF THE PREFERRED EMBODIMENTS

Referring now in greater detail to the drawings and initially to FIGS. 1 through 5, there is shown a first embodiment of a floating body according to the present invention and a method for producing the same. The floating body of this embodiment is made from a sheet of multi-layer film by single heat sealing and comprises a single substantially spherical portion and two substantially spherical portions of equal shape and equal size. The "floating body" used in the present invention is intended to mean not only a floating body such as a balloon and the like which is heat sealed and inflated with gas into a desired form and naturally floats in air due to the buoyancy of the gas enclosed within the body, but a stationary body which is heat sealed and inflated with gas into a desired form of animal, doll and the like and stationarily placed on the ground, floor and the like.

Figure 1:
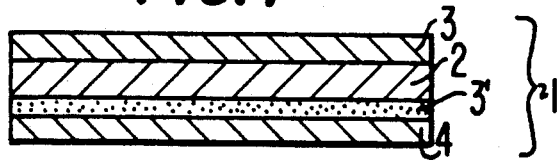
FIG. 1 is a cross-sectional view of a multi-layer film having a sealing capability which is employed in the present invention.
Figure 3A:
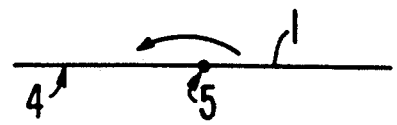
FIG. 3A is a side view showing the manner in which the multi-layer film of FIG. 1 is folded.
Figure 2:
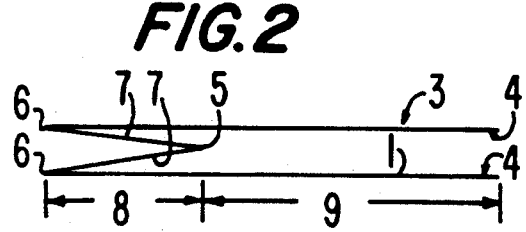
FIG. 2 is a side view showing the multi-layer film folded in accordance with a first embodiment of the present invention.
Figure 3B:
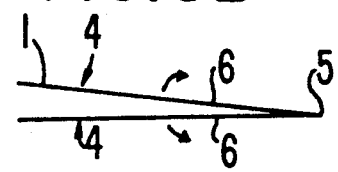
FIG. 3B is a side view showing the manner in which the multi-layer film folded in the middle thereof according to the manner of FIG. 3A is again folded to obtain the folded multi-layer film shown in FIG. 2.

FIG. 1 illustrates an example of a multi-layer film 1 consisting, for example, of a nylon film 2 having an aluminum film 3 deposited on the outer surface thereof and an anchor coat film 3' coated on the inner surface thereof, and a polyethylene resin film 4 laminated on the anchor coat film 3' by means of a melting and extruding method. The polyethylene laminate film 4 has a sealing capability and constitutes the innermost layer of the multi-layer film 1. As shown in FIG. 2, the multi-layer film 1 comprises a pleat portion 8 and a non-pleat portion 9, with the innermost layer 4 disposed inside the film 1. With the innermost layer 4 disposed inside, the multi-layer film 1 is folded at a first fold line 5 in the middle of the film 1 in the left direction indicated by the arrow in FIG. 3A to obtain the form of FIG. 3B. The multi-layer film 1 folded as shown in FIG. 3B is again folded at second fold lines 6 and 6 in the positions of equal distance from the first fold line 5 in the right directions indicated by the arrows in FIG. 3B so that pleats 7 and 7 can be formed between the first and second fold lines 5 and 6 as shown in FIG. 2.

Figure 4:
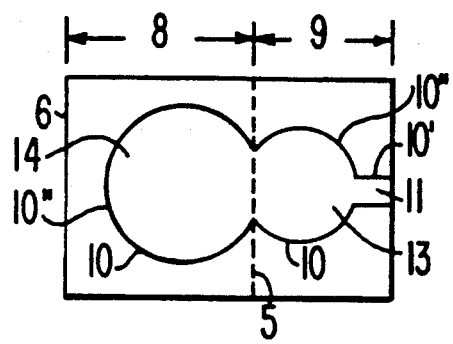
FIG. 4 is a top plan view showing the condition wherein the upper surface of the multi-layer film folded as shown in FIG. 2 has been heat sealed along a seal line in the form of a guitar.
Figure 5:
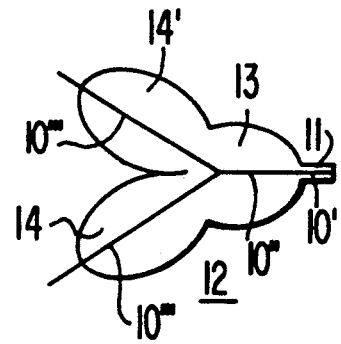
FIG. 5 is a plan view showing the condition wherein suitable gas has been introduced in a floating body obtained from FIG. 4.

FIG. 4 is a plan view of the multi-layer film 1 folded as described above, and the aforesaid fold line 5 is indicated by the broken line. The left side of the fold line 5 is the aforementioned pleat portion 8 having the pleats 7 and between the fold lines 5 and 6, while the right side is the aforementioned non-pleat portion 9 having no pleats. The multi-layer film 1 folded as described above is heat sealed along a seal line 10 confirming with a design or print to be formed. In this embodiment, the seal line 10 is in the form of a guitar, and has at its one end a straight portion 10' which will be a gas inlet port 11 of an inflated floating body 12, a first substantially circular portion 10" extending from the straight portion 10' which will be a single swelling portion 13 of the inflated floating body 12, and a second substantially circular portion 10''' which will be inflated a plurality of swelling portions 14 and 14' of the inflated floating body 12 which are equal to each other in shape and size. After the folded multi-layer film 1 has been heat sealed along the seal line 10, it is cut along the outside of the seal line 10 to obtain the floating body 12 shown in FIG. 5. The multi-layer film 1 sealed and cut as mentioned above is then inflated with suitable gas from the gas inlet port 11 into the inflated floating body 12 shown in FIG. 5. In FIG. 5, reference numerals 10', 10" and 10''' indicate heat-welded portions which are sealed along the seal line 10. In this way, a floating body comprising a single swelling portion with an gas inlet port and a plurality of swelling portions communicating with the single swelling portion and of substantially equal shape and equal size is very easily obtained from a sheet of multi-layer film by means of single heat sealing in accordance with the present invention. Thus, a complicated three dimensional floating body which has heretofore been produced through several complicated processes can be easily obtained by suitably forming the pleat portion and non-pleat portion of the multi-layer film according to the present invention.

Figure 6:
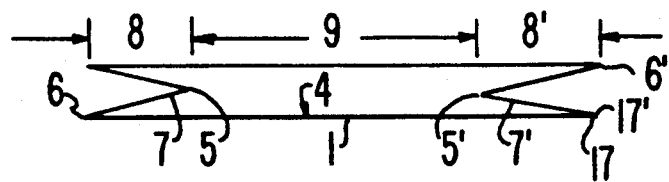
FIG. 6 is a side view of a multi-layer film folded in accordance with a second embodiment of the present invention.
Figure 7:
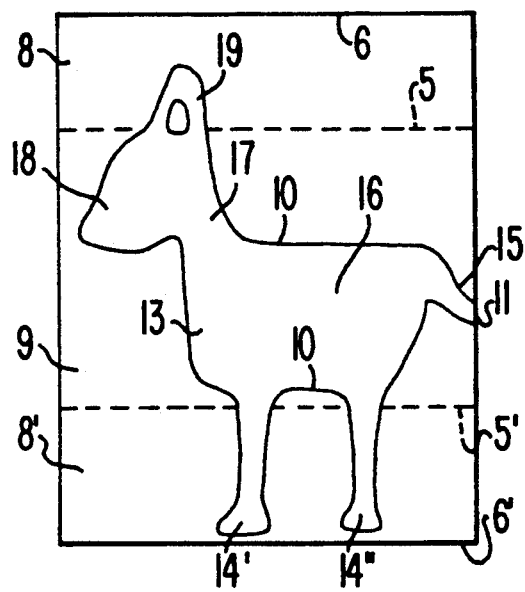
FIG. 7 is a top plan view showing the condition wherein the upper surface of the multi-layer film folded as shown in FIG. 6 is heat sealed along a seal line of an animal shape.
Figure 8:
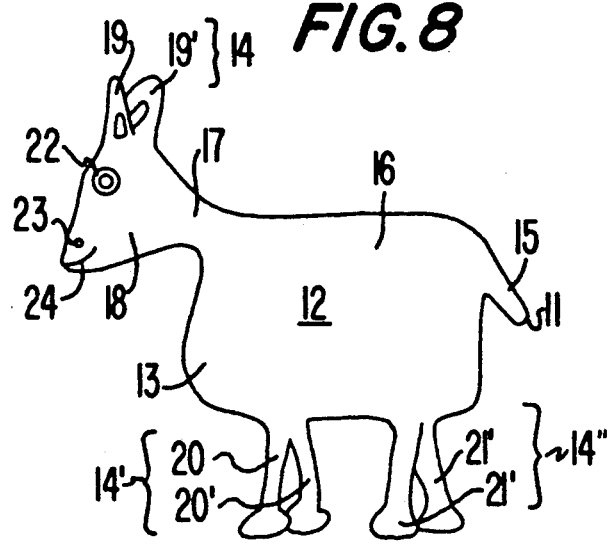
FIG. 8 is a perspective view showing the condition wherein suitable gas has been introduced in a floating body obtained from FIG. 7.

Referring to FIGS. 6 through 8, there is shown a second embodiment of a floating body according to the present invention. This embodiment has pleat portions at left and right ends or upper and lower ends of a multi-layer film. The parts substantially identical to those of the first embodiment of FIGS. 1 through 5 are designated by like reference numerals and therefore the detailed description will hereinafter be omitted. A single sheet of multi-layer film 1 of the second embodiment is folded as shown in FIG. 6. One end of the film 1 is indicated by reference numeral 17, and the other end by reference numeral 17'. As a result, pleat portions 8 and 8' are formed at the opposite portions of the multi-layer film 1, and a non-pleat portion 9 is formed between the pleat portions 8 and 8'. The pleat portions 8 and 8' are substantially identical with each other, the portions associated with the pleat portion 8' being designated by the symbol (').

The multi-layer film 1 folded as shown in FIG. 6 is heat sealed along a seal line 10 shown in FIG. 7, and cut along the outside of the seal line 10 to obtain a floating body 12 as shown in FIG. 8. The multi-layer film 1 is then inflated with suitable gas into the floating body 12. As a result, the non-pleat portion 9 sealed along the seal line 10 is inflated as a single swelling portion 13 consisting of a tail portion 15, trunk portion 16, neck portion 17 and head portion 18, while the pleat portion 8 sealed along the seal line 10 is inflated as a plurality of swelling portions 14 of exactly equal size consisting of ear portions 19 and 19'. The pleat portion 8' disposed in symmetrical relationship to the pleat portion 8 is inflated as a plurality of swelling portions 14' of exactly equal size consisting of front leg portions 20 and 20' and as a plurality of swelling portions 14" of exactly equal size consisting of rear leg portions 21 and 21'. It is preferable that such parts as an eye 22, nose 23, mouth 24 and the like be printed in advance.

Figure 9:
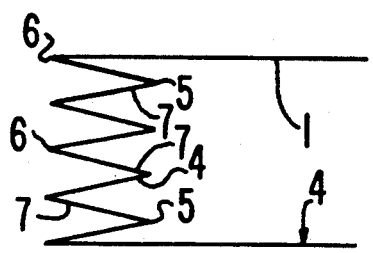
FIG. 9 is a side view of a multi-layer film folded in accordance with a third embodiment of the present invention.

Referring to FIG. 9, there is shown a third embodiment of a floating body according to the present invention. The parts substantially identical to those of the first embodiment of FIGS. 1 through 5 are designated by like reference numerals and therefore the description will hereinafter be omitted. This embodiment is characterized in that three or more swelling portions of exactly equal size can be obtained by increasing the number of pleats 7 as shown in FIG. 9.

Figure 10:
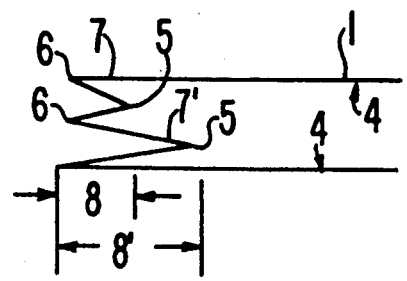
FIG. 10 is a side view of a multi-layer film folded in accordance with a fourth embodiment of the present invention.

Referring to FIG. 10, there is shown a fourth embodiment of a floating body according to the present invention. The parts substantially identical to those of the first embodiment of FIGS. 1 through 5 are designated by like reference numerals. This embodiment is characterized in that different pleat portions 8 and 8' of different length can be obtained by forming a shorter pleat 7 and a longer pleats 7' as shown in FIG. 10.

Figure 11:
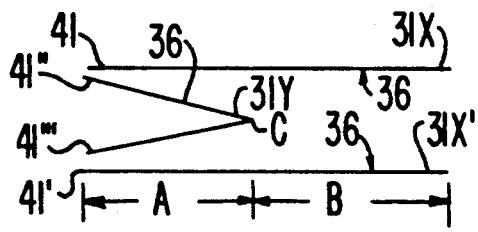
FIG. 11 is a side view showing an upper flat multi-layer film, an intermediate folded multi-layer film and a lower flat multi-layer film which are overlapped with one another in accordance with a fifth embodiment of the present invention.
Figure 12:
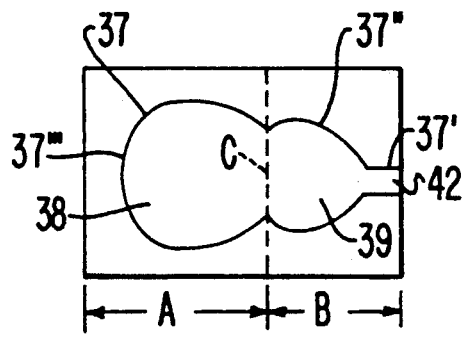
FIG. 12 is a top plan view showing the condition wherein the upper surface of the overlapped multi-layer films has been heat sealed.
Figure 13:
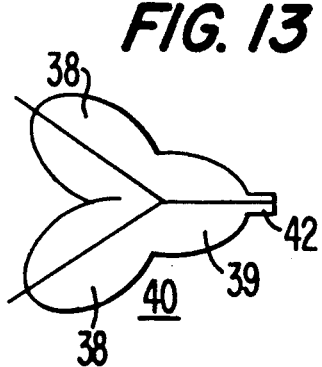
FIG. 13 is a plan view showing the condition wherein suitable gas has been introduced in a floating body obtained from FIG. 12.

Referring to FIGS. 11 through 13, there is shown a fifth embodiment of a floating body according to the present invention. Unlike the embodiments shown in FIGS. 1 through 10, this embodiment is characterized in that the floating body is obtained from a plurality of films consisting of two flat multi-layer films 31X and 31X' and a single folded multi-layer film 31Y. Each of these multi-layer films is the same as the multi-layer film 1 shown in FIG. 1 and thus comprises a nylon film having an aluminum film deposited on one surface thereof and an anchor coat film coated on the other surface thereof, and a polyethylene resin film laminated on the anchor coat film by means of a melting and extruding method. The polyethylene laminate film has a sealing capability and constitutes an innermost layer 36 of each of the aforesaid multi-layer films 31X, 31X' and 31Y.

The intermediate folded film 31Y is folded at a fold line C in the middle of the film as shown in FIG. 11 and arranged between the upper and lower flat films 31X and 31X'. The films 31X, 31Y and 31X' are then overlapped with one another so that the end 41 of the upper film 31X, the ends 41" and 41'" of the intermediate film 31Y and the end 41" of the lower film 31X' are vertically aligned with one another. As shown in FIG. 11, each innermost layer 36 having a sealing capability is arranged inside so that the films 31X, 31Y and 31X' can be sealed together when heat is applied on the upper film 31X. With this arrangement, the upper film 30X is heat sealed along a seal line 37 to obtain a floating body 40. As shown in FIG. 13, the floating body 40 obtained as described above has a gas inlet port 42 at its one end, two swelling portions 38 and 38 of substantially spherical configuration at its the other end, and a single swelling portion 39 between the gas inlet port 42 and the two swelling portions 38 and 38.

In FIG. 12, the aforesaid fold line C is indicated by the broken line. The left side of the fold line C is a pleat portion A, while the right side is a non-pleat portion B. The multi-layer films 31X, 31Y and 31X' overlapped as described above is heat sealed along the seal line 37 extending over both the pleat portion A and non-pleat portion B. The seal line 37 is in the form of a guitar, and has at its one end a straight portions 37' which is to be inflated into the gas inlet port 42 of the floating body 40, a first substantially circular portion 37" extending from the straight portion 37' which is to be inflated into the single swelling portion 39 of the floating body 40, and second substantially circular portions 37'" which is to be inflated into the swelling portions 38 of the floating body 40. When the upper and lower flat films 31X and 31X' are overlapped with each other, the portion wherein the intermediate folded film 31Y is overlapped with the upper and lower flat films 31X and 31X' will be the aforesaid pleat portion A, while the portion wherein the intermediate folded film 31Y is not overlapped with the upper and lower flat films 31X and 31X' will be the aforesaid non-pleat portion B.

Figure 14:
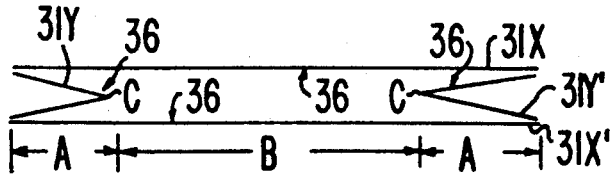
FIG. 14 is a side view showing an upper flat multi-layer film, two intermediate folded multi-layer films of equal size and a lower flat multi-layer film which are overlapped with one another in accordance with a sixth embodiment of the present invention.

FIG. 14 illustrates a sixth embodiment of a floating body according to the present invention. The members substantially identical to those of the fifth embodiment of FIG. 11 are designated by like reference numerals for avoiding the description. This embodiment is characterized in that two folded multi-layer films 31Y and 31Y' are provided between flat films 31X and 31X' to obtain a floating body comprising two left and right swelling portions or two upper and lower swelling portions.

Figure 15:
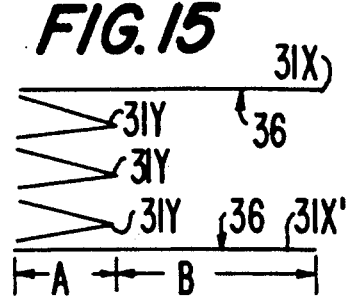
FIG. 15 is a side view showing an upper flat multi-layer film, three intermediate folded multi-layer films of equal size and a lower flat multi-layer film which are overlapped with one another in accordance with a seventh embodiment of the present invention.

FIG. 15 illustrates a seventh embodiment of a floating body according to the present invention. The members substantially identical to those of the fifth embodiment of FIG. 11 are designated by like reference numerals. This embodiment is characterized in that three intermediate folded multi-layer films 31Y, 31Y and 31Y are provided between upper and lower flat multi-layer films 31X and 31X' for obtaining three swelling portions of exactly equal size. Thus, a plurality of swelling portions of exactly equal size can be obtained by increasing the number of intermediate folded multi-layer films of equal length.

Figure 16:
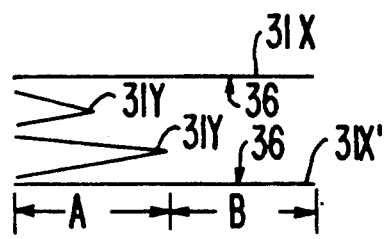
FIG. 16 is a side view showing an upper flat multi-layer film, different intermediate folded multi-layer films of different size and a lower flat multi-layer film which are overlapped with one another in accordance with an eighth embodiment of the present invention.

FIG. 16 illustrates an eight embodiment of a floating body according to the present invention. The members substantially identical to those of the fifth embodiment of FIG. 11 are designated by like reference numerals. This embodiment is characterized in that a plurality of intermediate folded multi-layer films 31Y and 31Y of different length are provided between upper and lower flat multi-layer films 31X and 31X' for obtaining different pleat portions of different length.

Figure 17:
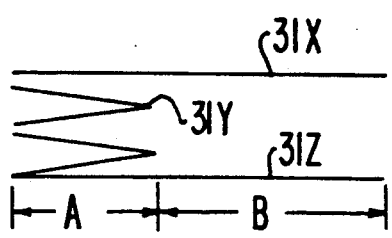
FIG. 17 illustrates the case that a floating body is obtained by the combination of a flat multi-layer film having no folded portion, a folded multi-layer film folded in the middle thereof, and a partially folded multi-layer film having a flat portion and a folded portion at the one end of the flat portion.
Figure 18:
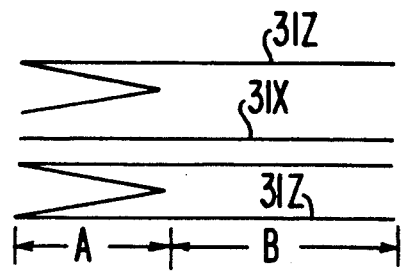
FIGS. 18 through 21 respectively illustrate the cases that a floating body is obtained by the combination of at least one flat multi-layer film having no folded portion and at least one partially folded multi-layer film having a flat portion and a folded portion folded at the one end of the flat portion.
Figure 19:
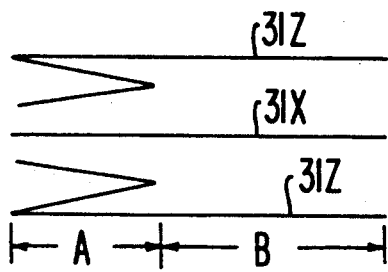
Figure 20:
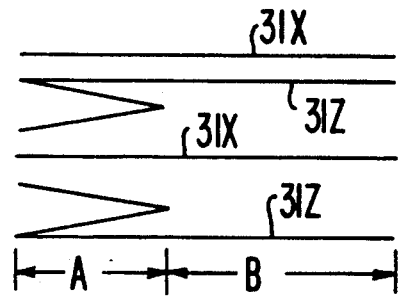
Figure 21:
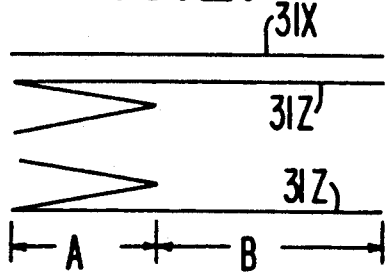

While it has been illustrated and described that, with respect to FIGS. 11 through 16, a floating body is obtained by the combination of the flat film 31X having no folded portion and the folded film 31Y folded in the middle thereof, FIG. 17, shows the case that a floating body is obtained by the combination of a flat film 31X having no folded portion, two folded films 31Y folded in the middle thereof, and a partially folded film 31Z having a flat portion and a folded portion at the one end of the flat portion, and FIGS. 18 through 21 show the cases that a floating body is obtained by the combination of at least one flat film 31X having no folded portion and at least one partially folded film 31Z having a flat portion and a folded portion folded at the one end of the flat portion, respectively.

The multi-layer film employed in the present invention may comprise a film having a sealing capability at its one surface and a film having no sealing capability at the opposite surface. For instance, a plastic film having coated thereon a synthetic resin having a lower melting point than that of the plastic film may be used as a film having a sealing capability, and a plastic film having metal deposited on one surface thereof may be used as a film having no sealing capability.

In the case the floating body obtained according to the present invention is maintained inflated for a longer time, it is necessary to select a film having a better gas barrier performance, while in the case the floating body is not maintained inflated for a longer time, it is not necessary to select a film having a better gas barrier performance.

Heat sealing means employed in the present invention may comprise a heat plate sealing, impulse sealing, high-frequency sealing, ultrasonic sealing or the like.

From the foregoing description, it will be seen that in accordance with the present invention, there is provided a floating body of complex shape obtained by single heat sealing and a method for producing such a floating body.

While certain representative embodiments and details have been shown for the purpose of illustrating the invention, it will be apparent to those skilled in this art that various changes and modifications may be made therein without departing from the scope of the invention.

What we claim is:

1. A method for producing a floating body such as a balloon which has a fist swelling portion with a gas inlet port and a plurality of second swelling portions each communicating with said first swelling portion, comprising the steps of:

folding a single multi-layer film having a sealing capability to form a nonpleat portion and pleat portions so that said nonpleat portion corresponds to said first swelling portion of said floating body correspond to said plurality of second swelling portions;

sealing the folded multi-layer film along a continuous seal line which extends over both said pleat and nonpleat portions and forms said gas inlet port in said nonpleat portion, to produce said first swelling portion and said plurality of second swelling portions; and cutting and removing material located externally of the sealed multi-layer film along a line substantially parallel to said seal line.

2. A method as set forth in claim 1, wherein said plurality of second swelling portion of said floating body comprise swelling portions of exactly equal size.

3. A method as set forth in claim 1, wherein said plurality of second swelling portions of said floating body comprise different swelling portions of different length.

4. A method as set forth in claim 1, wherein the step of sealing comprises sealing the folded multi-layer film along a continuous seal line which extends from said nonpleat portion into said pleat portions and back into said nonpleat portion.

5. A method as set forth in claim 1, wherein the step of folding comprises folding the single multi-layer film to form pleat portions corresponding to a plurality of second swelling portions of unequal size.

6. A method as set forth in claim 1, wherein the step of folding produces a plurality of pairs of superposed strata of said film in said pleat portions, and said step of sealing comprises sealing the film along a continuous seal line through a plurality of said pairs of strata of said film.

* * * * *

UNITED STATES PATENT AND TRADEMARK OFFICE
CERTIFICATE OF CORRECTION

PATENT NO. : 5,017,254

DATED : May 21, 1991

INVENTOR(S) : Tatsuo Noguchi

It is certified that error appears in the above-identified patent and that said Letters Patent is hereby corrected as shown below:

Title page, item [73], "Nihonmatal Co., Ltd." should be --Nihonmatai Co., Ltd.--.

Claim 1, column 8, line 7, after "body", insert --and said pleat portions--.

Signed and Sealed this

Ninth Day of February, 1993

Attest:

STEPHEN G. KUNIN

Attesting Officer

Acting Commissioner of Patents and Trademarks